Feb. 26, 1963  A. BECHLER  3,078,582
FINE-ADJUSTMENT DEVICE WITH THREADED SPINDLE
Filed Dec. 21, 1959
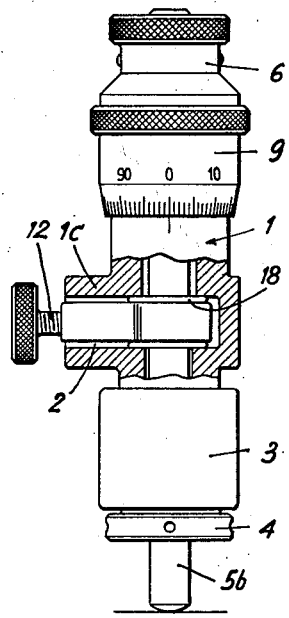
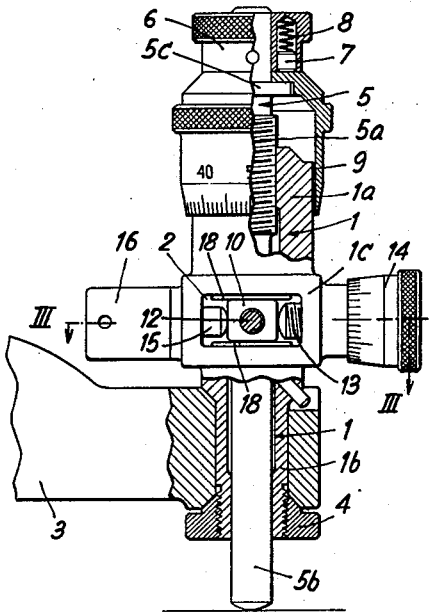
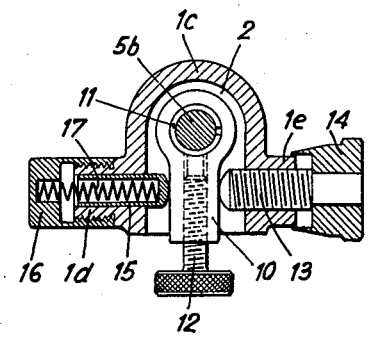
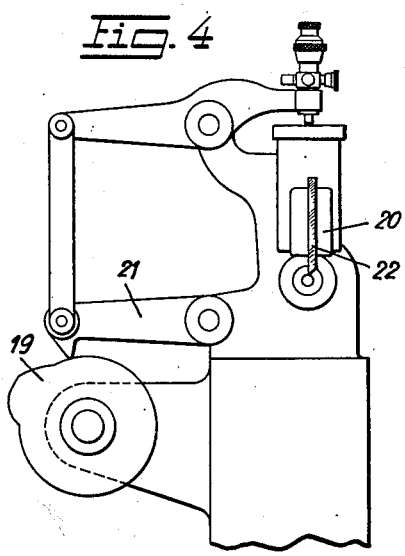

United States Patent Office 3,078,582
Patented Feb. 26, 1963

1

3,078,582
FINE-ADJUSTMENT DEVICE WITH
THREADED SPINDLE
André Bechler, 4 Rue Centrale, Moutier, Switzerland
Filed Dec. 21, 1959, Ser. No. 861,066
Claims priority, application Switzerland Mar. 18, 1959
4 Claims. (Cl. 33—170)

My present invention relates to an improved microadjustment device comprising a threaded spindle screwable in a housing and connected to a scale drum.

Devices of this type are used, for example on automatic lathes which serve for machining small watch components, as intermediate member between a control cam and a tool-carrying slide or rocker. With increasing requirements for accuracy of the parts made on the lathe, there also are increased the demands for fineness of the adjustments to be made by such devices or attachments.

The invention aims at providing an easily manipulable and readable adjusting device with which may be made setting corrections of the order of magnitude of a thousandths of a millimeter. To such end the device disclosed by the present invention comprises an arm disposed in a recess of the housing between elastically compressible elements lockable on a smooth portion of the threaded spindle, and an adjusting screw for turning said arm about the axis of said spindle, said screw being adjustable in a threaded cross-hole which opens into said recess and being provided with a scale ring.

A preferred embodiment of the invention is shown, by way of example, in the drawing in which FIG. 1 shows the device in elevation and partly in longitudinal section, FIG. 2 is a side-elevation thereof and partly in longitudinal section, FIG. 3 is a cross-section on the line III—III of FIG. 2 and FIG. 4 is a highly simplified and schematized endview of an automatic lathe on which the device is used as attachment.

The device shown in FIGS. 1 to 3 comprises an elongated housing 1 which in turn comprises two coaxial, hollow cylindrical end sections 1a, 1b and a center section 1c which forms a recess 2 and has two lateral opposite ears 1d, 1e. A nut 4 screwed on to the lower end of section 1b serves for clamping the device or attachment in a bore of a machine part 3.

A screw spindle 5 is screwable with its upper portion 5a which is provided with fine threads, in the upper internally threaded end-portion of housing section 1a and its smooth shank 5b is guided in the lower end-portion of housing section 1b. To the upper end of screw spindle 5 is fixed, through a cross-pin, an actuating ring 6 which has a plurality of blind bores arranged parallel to its axis, in each of said bores is accommodated a small piston 7 and a spring 8 biasing same. Said pistons rest on the outside of the bottom of a caplike drum 9 which through said bottom bears on a collar 5c of spindle 5.

In recess 2 is disposed an arm 10 which by means of a split bushing 11 is pivoted to shank 5b of spindle 5. In a threaded hole of arm 10, which opens into bushing 11, is adjustable a screw 12 which has a knurled head and which, when tightened, presses bushing 11 against spindle shank 5b and thereby firmly locates arm 10 on spindle 5.

Ear 1e has a threaded hole which opens into recess 2, and the axis of said hole is at right angles to the intermediate position of arm 10 and is spaced from the axis of spindle 5. In said hole is adjustable a correcting adjustment screw 13 to the outside end of which is fixed a scale ring 14. In a smooth bore of ear 1d coaxial to said threaded hole, is movably disposed a small hollow piston 15; between the bottom of said piston adjacent arm 10 and a cap 16 screwed on to ear 1d is inserted a compression spring 17 for pressing arm 10 against screw 13.

Between the endfaces of arm 10 and the walls of recess 2 parallel thereto are disposed two washers 18 made of rubber or some other compressible material.

The mode of operation of the device or attachment disclosed is now described on the example of application shown in FIG. 4, in which the device is an intermediate member of the transmission of motion from a control cam 19 to a tool-carrying slide 20 of an automatic lathe. For setting the forward end-position which the knife-edge of the tool 22 clamped in slide 20 occupies with respect to the workpiece when the ridge of cam disc 19 passes underneath cam-tracing lever 21, first spindle 5 is actuated by means of ring 6 until said knife-edge has moved close to the desired or predetermined position. After having clamped a test work-piece in place, the lathe is set in operation, whereupon the lathe is stopped again and the diameter of the workpiece at the machined portion is measured with the aid of a high-precision measuring tool. When the diameter differs from the desired measure only by a couple of hundredths or thousandths of a millimeter, arm 10 is firmly located on screw spindle 5 by tightening the screw 12. Correction of the adjustment may now be made at the first attempt by actuating the correction screw 13, the correction effected being readable from the scale of ring 14. One division of said scale may correspond, for example, to 1/1000 millimeter, and a full revolution of screw 13 may correspond to one division of the scale on drum 9.

It is to be noted that when screw 12 is slack, i.e. when correction screw 13 is cut out, screw spindle 5 can be adjusted through a very wide range, and that in this entire range correction screw 13 may be cut in.

What I claim as new and desire to secure by Letters Patent, is:

1. In a micro-adjustment device having a screw spindle adjustable on a housing and connected to a scale drum, the improvement comprising an arm disposed in a housing recess between and engaged with elastically compressible elements and clampable to a smooth portion of said spindle, and an adjusting screw for turning said arm about the axis of said spindle, said adjusting screw being provided with a scale ring and being adjustable in a threaded cross-hole which opens into said recess.

2. A device as set out in claim 1, in which a small spring-loaded piston mounted in a crossbore of said housing presses said arm against said adjusting screw.

3. A micro-adjustment device comprising a tubular housing having an enlarged central portion with a slotted recess therein extending transversely to the axis of said housing, a spindle extending entirely through said housing and having a threaded engagement with said housing whereby rotation of said spindle moves said spindle axially through said housing, one end of said spindle being an article engaging end and means on the other end of said spindle for effecting the rotation of the same, a scale drum connected to said spindle at said other end and cooperating with said housing for indicating the relative position of said spindle with respect to said housing, an arm disposed in said housing central portion and projecting into said recess, said arm having one end journaled on a smooth portion of said spindle with said spindle being freely rotatable in said arm, clamp means carried by said arm for fixedly securing said arm to said spindle, an adjusting screw threaded into said housing with the axis of said adjusting screw being offset from and at right angles to the axis of said spindle, said adjusting screw engaging said arm in a direction to advance said spindle through said housing, means carried by said housing resiliently resisting rotation of said arm by said adjusting screw, and a scale ring connected to said adjusting screw and cooperating with said housing for indicating the axial movement of said spindle in response to movement of said adjusting screw.

4. The micro-adjustment device of claim 3 wherein an elastically compressible element is tightly positioned between said housing and upper and lower surfaces of said arm to eliminate play in the threaded connection between said spindle and said housing.

References Cited in the file of this patent

UNITED STATES PATENTS 1,803,283    Parker _____ Apr. 28, 1931

FOREIGN PATENTS 238,707    Switzerland _____ Nov. 16, 1945